United States Patent [19]

Budrose

[11] 3,852,817

[45] Dec. 3, 1974

[54] COMBINATION CARD AND TAPE RECORDER

[76] Inventor: Charles R. Budrose, 127 Country Club Rd., Melrose, Mass. 02176

[22] Filed: Oct. 16, 1972

[21] Appl. No.: 297,947

Related U.S. Application Data

[63] Continuation-in-part of Ser. No. 273,441, July 20, 1972.

[52] U.S. Cl........................... 360/88, 360/2, 360/94, 360/96, 360/130

[51] Int. Cl.... G11b 5/00, G11b 15/60, G11b 19/20

[58] Field of Search....... 274/4 J, 4 A; 179/100.2 T; 360/2, 88, 94, 96, 130

[56] References Cited

UNITED STATES PATENTS

| | | | |
|---|---|---|---|
| 2,603,006 | 7/1952 | MacChesney et al. | 274/4 J |
| 3,584,882 | 6/1971 | Krtous | 274/4 J |
| 3,610,635 | 10/1971 | Schiff | 274/4 J |
| 3,649,773 | 3/1972 | Trammell | 274/4 A |

*Primary Examiner*—Harry N. Haroian
*Assistant Examiner*—John W. Shepperd
*Attorney, Agent, or Firm*—Wolf, Greenfield & Sacks

[57] ABSTRACT

A recorder and player for accommodating either a tape cassette or a card having a magnetic strip affixed thereto comprises common control means for permitting recording, playback or erasing, a mode selector switch, track extenders usable when in the card mode of operation and separate drive mechanisms for card and tape. A card drive wheel is preferably disposed opposite the transducer head and is displaceable from a card driving position when in the card mode to a lower position spaced from the transducer head when in the tape mode to thereby permit the device to receive a tape cassette in an accommodating recess thereof. The device also includes a track selector switch for moving the transducer head vertically allowing the tracing of two recorded messages on either the card strip or tape. Interlock means permit recording and playback on one track but only playback on the other track.

15 Claims, 8 Drawing Figures

COMBINATION CARD AND TAPE RECORDER

This is a continuation-in-part of application Ser. No. 273,441, filed July 20, 1972.

FIELD OF THE INVENTION

The present invention relates in general to a combination tape and card recorder and player. More particularly, the present invention is directed to such a combination recorder and player that has common control means for enabling recording, playback or erasing, and is constructed to receive either a tape cassette or a card having a magnetic strip affixed thereto.

BACKGROUND OF THE INVENTION

There have been adapters constructed for use with conventional tape recorders for enabling these recorders to receive cards and record on and play back messages from these cards. See, for example, U.S. Pat. Nos. 3,584,882 and 3,610,635 or my copending application Ser. No. 273,441. Although these adapters have been successfully used, there are certain disadvantages associated therewith. For example, there must be provided a separate adapter which must be removed in order to play a cassette and which is not always usable with other recorders. In the present invention there is no need for a separately installed adapter for playing cards. Another drawback associated with known devices is that one usually has to provide two discrete transducer heads. These devices are generally more expensive than the device of the present invention.

Accordingly, an object of the present invention is to provide a combination card and tape recorder having common control means and means for selecting either the card or tape mode of operation.

A further object of the present invention is to provide an audio recording and reproducing machine for accommodating both cards and tape, that is relatively inexpensive and does not use a separate adapter for handling a card.

Still another object of the present invention is to provide a combination card and tape recorder that is constructed to receive a conventional tape cassette when in the tape mode of operation, and is constructed to receive a card in a guided channel thereof when in the card mode of operation. The device preferably also includes channel extenders extendible from the sides of the recorder for extending the length of the card guide channel. When in the tape mode of operation these guide extenders are retracted.

Still a further object of the present invention is to provide a combination card and tape recorder wherein the transducer means associated therewith can be used in association with both card and tape recording and reproducing.

Another object of the present invention is to provide a combination card and tape recorder that includes track selector means for changing between two separate tracks on the card or tape, one of which allows both recording and playback, and the other of which allows only playback.

Still another object of the present invention is to provide a combination card and tape recorder having a well for receiving a tape cassette, a guide channel for receiving a card having a magnetic strip attached thereto, and means for driving the card along a bottom edge which is below the bottom surface defining the cassette accommodating well.

SUMMARY OF THE INVENTION

To accomplish the foregoing and other objects of the present invention, there is provided an audio recording and reproducing machine capable of handling either a tape cassette or a card having a magnetic medium associated therewith. The machine comprises a housing having means defining a well for receiving the tape cassette, means for driving the tape in the cassette which in a preferred embodiment includes a capstan drive, and means for driving the card. The housing is configured to define a guide channel for the card and an opening for receiving the card driving means. A manually operated switch is provided for selecting either the card or tape mode of operation. A means is responsive to the manually operated means when in the tape position for maintaining the card drive means in the opening and enabling the tape drive means, and is responsive to the manually operable means when in the card position for moving the card drive means out of the opening adjacent to the channel and disabling the tape drive means.

In one embodiment disclosed herein the card drive means includes a card drive wheel which is selectively switched from a lowermost position below the bottom wall defining the cassette receiving well to an uppermost position engaging a main drive wheel and the card when it is in position. Also, the movement of the manually operable means, besides causing a movement of the card drive wheel, also selectively enables and disables the capstan tape drive, causing the channel extenders to be extended during the card mode of operation and retracted during the cassette mode of operation.

In another embodiment of the present invention the card drive means is not selectively moved in and out of its opening but is maintained in a fixed position for driving a bottom edge of the card. In this embodiment a preferably spring loaded bearing pad is disposed opposite the transducer head and when there is no cassette in the recorder it urges a card against the head as it is propelled through the channel. When the cassette is introduced into the device this bearing pad is depressed and does not interfere with normal tape recording and playing.

BRIEF DESCRIPTION OF THE DRAWINGS

Numerous other objects, features and advantages of the invention will now become apparent upon a reading of the following detailed description taken in conjunction with the accompanying drawings in which:

In FIG. 1 the machine has a card positioned therein.

In FIG. 5 the mode selection mechanism is in the card mode of operation;

DETAILED DESCRIPTION

Figure 1:
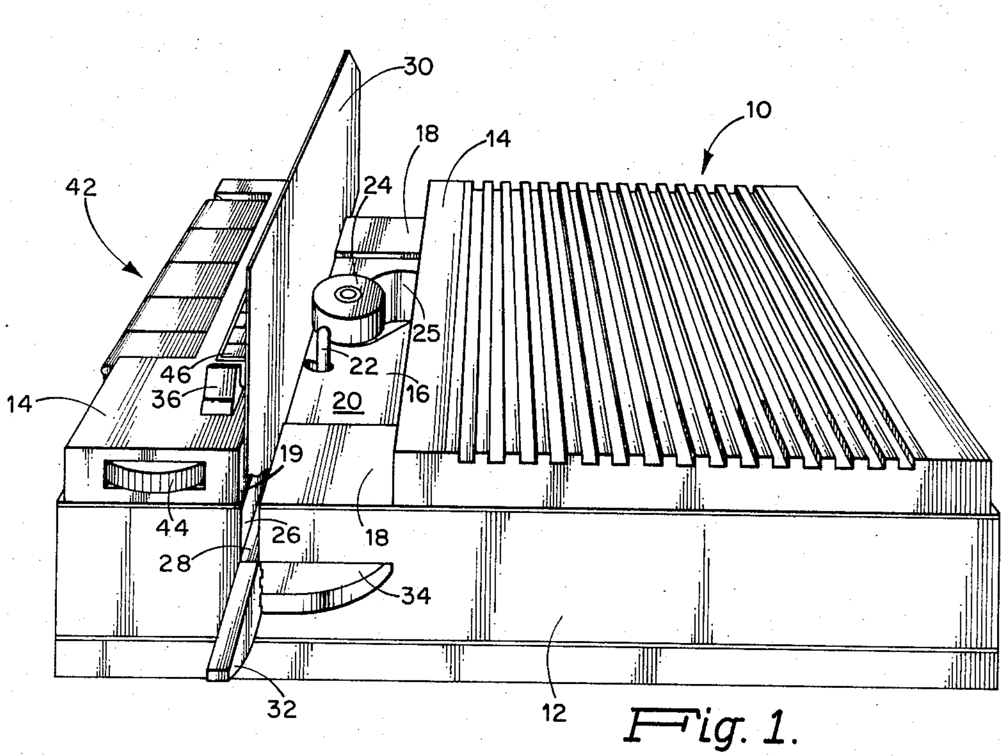
FIG. 1 is a perspective view of a recording and reproducing machine constructed in accordance with the principles of the present invention.

Referring now to the drawings and in particular to the perspective view of FIG. 1, there is shown a recording and reproducing machine 10 constructed in accordance with the principles of the present invention. This machine may be constructed of hard plastic and it is generally constructed in the form of a box-like housing 12 having a top wall 14 defining a cassette receiving well 16. In FIG. 1 there is no cassette shown in the well 16. A pair of side members 18 define the sides of the cassette receiving well 16. The well has a bottom floor 20 which covers the drive mechanism of the present invention and has the capstan 22 and card drive wheel 24 extending therethrough. Wheel 24 is retractable into opening 25 as discussed hereinafter.

In FIG. 1 a card 30 is shown in card channel 26 which is defined in part by side members 18 and vertical wall 19. Channel 26 has a bottom track 28 upon which the card 30 rests. FIG. 1 also shows one track extender 32 which lengthens track 28 when in the card mode of operation. When in the cassette mode of operation track extenders 32 retract into the receiving recesses 34, only one of which is shown in FIG. 1.

Figure 5:
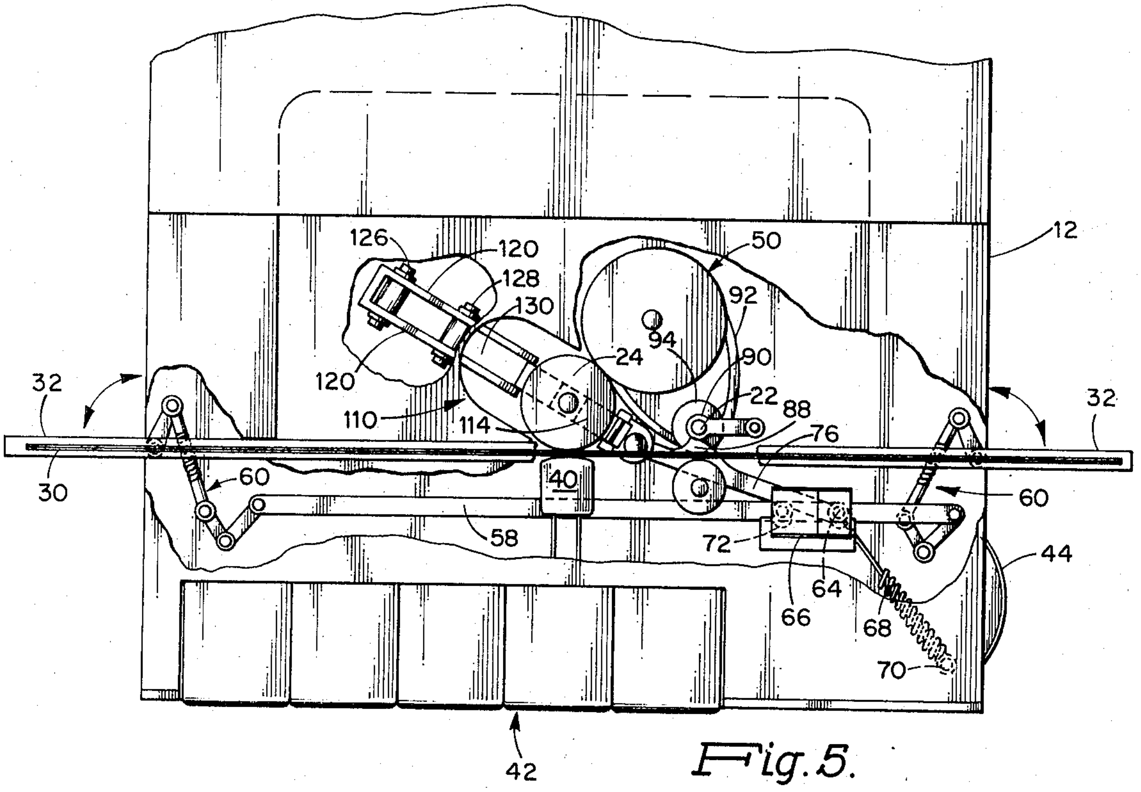
FIG. 5 is a fragmentary plan view of the recording and reproducing machine shown in FIG. 1 and partially cut away to illustrate an alternate embodiment for the mode selection means and drive means of the present invention.
Figure 2:
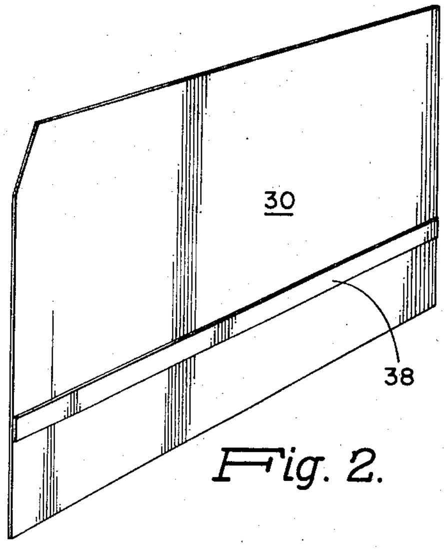
FIG. 2 shows a typical card such as the one depicted in FIG. 1.

The operation of the track extenders 32, the capstan 22 and card drive wheel 24 is controlled, as will be discussed in more detail hereinafter, by mode selector switch 36. When the switch 36 is in the card mode of operation the card drive wheel 24 is in the position shown in FIG. 1 urging the magnetic strip 38 (see FIG. 2) against the transducer head 40 which is shown in FIG. 5. Alternatively, in the cassette mode of operation the card wheel drive 24 is displaced into opening 25 and below the floor 20 and the capstan 22 is used to drive the tape in the cassette. Registration pins (not shown) may be provided for properly positioning the cassette in the well.

FIG. 1 also depicts control button array 42 which in the embodiment of FIG. 1 comprises five control buttons for providing such functions as recording, playback, rewind, fast forward, and stop. A volume control dial 44 is also used in the machine.

It is preferred in the machine of this invention that recording be permitted on either of two separate tracks whether using the tape cassette or the card having the magnetic strip affixed thereto. Thus, there is provided a track selector switch 46 adjacent the mode selector switch 36 for controlling the displacement of the transducer head 40 between two alternate vertical elevations for recording on and reading from separate tracks of the recording media. The mechanism for switching between alternate positions of the transducer head is a relatively simple mechanism and one that is well-known in the art and thus has not been shown in detail herein.

Another feature that may be incorporated in the machine of this invention is the use of interlock means for preventing recording on one of the tracks referred to as the instructor track, while permitting both recording and playback from the other track which may be referred to as the student track. The mechanism for facilitating this operation is not shown in this application but is discussed in detail in my prior application Ser. No. 273,441.

Figure 3:
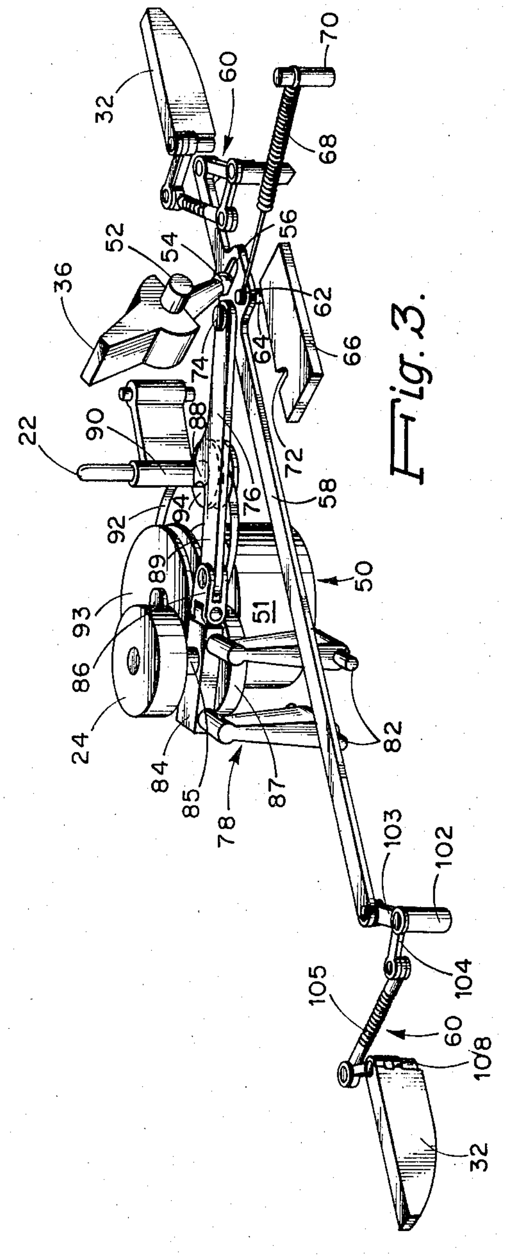
FIG. 3 is a perspective view showing an embodiment of the mode selection mechanism of the present invention in the card drive mode of operation and including a mode selector switch card drive means, cassette drive means, and channel extender means.
Figure 4:
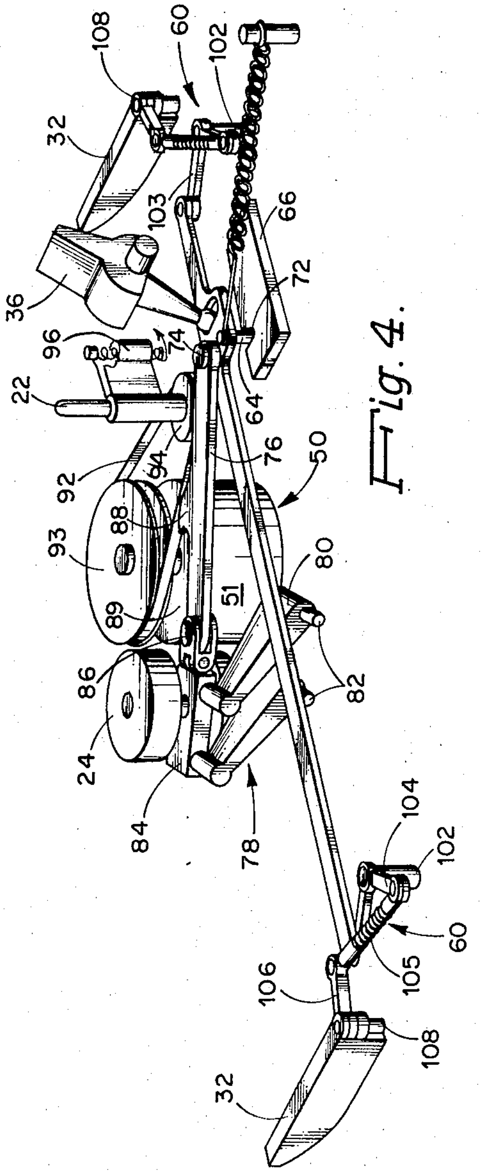
FIG. 4 is a perspective view similar to the one shown in FIG. 3 with the mode selection mechanism in the cassette mode of operation.

FIGS. 3 and 4 are substantially identical perspective views showing one embodiment for the mode selection mechanism of the present invention in the card and tape modes of operation, respectively. The mechanism generally comprises a common drive means 50 which includes drive motor 51, capstan 22, card drive wheel 24, track extenders 32, and mode selector switch 36. Most of the pivot points shown in FIG. 3 and discussed hereafter are affixed at suitable locations in the housing 12 below the bottom floor 20. As depicted in FIG. 1 only the capstan 22, card drive wheel 24 and mode selector switch 36 can extend above floor 20.

The mode selector switch 36 pivots about pin 52 which may be secured by suitable means from the top wall 14, for example. The switch 36 has a spherical bottom end 54 which fits within an accommodating recess 56 defined in shoulder 62 of elongated spring-like bar 58. The movement of bar 58 controls the movement of the card drive wheel 24, capstan 22 and the track extenders 32. Hence, the opposite ends of bar 58 each connect to track extender mechanism 60. A plan view of mechanism 60 is also shown in the alternate embodiment depicted in FIG. 5 and discussed hereinafter. The shoulder 62 of bar 58 has a pin 64 depending therefrom which is held against detent plate 66 by means of spring 68 which is secured at one end to pin 64 and at the other end to a securing post 70 which is suitably fastened in the housing 12. Spring 68 normally biases the entire bar 58 toward the right as depicted in FIG. 3 or in the card drive position. When the bar 58 is moved to the left by rotating the switch 36 to the tape drive position shown in FIG. 4 the pin 64 falls into detent 72 and is secured therein until the mode selector switch 36 is again reverted to the position shown in FIG. 3 for card drive operation.

In the vicinity of shoulder 62 there is also provided a pin 74 for attaching one end of arm 76 thereto. The other end of arm 76 connects to pivot assembly 78 which is shown in its upright position in FIG. 3. Pivot assembly 78 comprises a pair of pivot arms 80 pivoted at their bottom end about pivot pins 82. Pivot arms 80 are secured at their top end to retaining block 84 which has the card drive wheel 24 rotatably secured thereto by shaft 85. Shaft 85 is driven from base wheel 87 which is selectively engageable with an output drive wheel 89 of drive motor 51. The arm 76 secures to block 84 by means of mechanism 86. In FIG. 3 the arm 76 is moved to its rightmost position and thus the card drive wheel 24 is, as depicted in FIG. 1, above the bottom floor 20 and in engagement with the card 30. In this card drive position it is noted that the arm 76 has a flange 88 which is urged against capstan support 90 for urging the capstan away from the drive belt 92 thereby not providing any drive to capstan 22 by way of pulley 94 which is secured thereto. Belt 92 is driven from drive pulley 93 of motor 50.

When the mode selector switch is moved to the cassette drive position shown in FIG. 4 the arm 76 causes the card drive wheel 24 to move downward and to the left as viewed in FIG. 4 so that the base drive wheel 87 disengages from the common drive wheel 89. This movement of arm 76 also causes the card drive wheel 24 to position itself below floor 20. At the same time the flange 88 of arm 76 disengages from capstan support 90 and a spring housed in support 96 causes the capstan 22 and its associated drive pulley 94 to engage with belt 92.

As previously mentioned a track extender mechanism 60 couples from each end of spring-like bar 58. This mechanism comprises a secured pivot post 102 having arms 103 and 104 extending therefrom. Arm 103 also couples to arm 58 and arm 104 connects by arms 105 and 106 to secured pivot member 108. In the position shown in FIG. 3 bar 58 has been pushed toward the right and the mechanism 60 has pivoted about pivot points 102 and 108 causing the track extender 32 to extend outwardly, as shown. When the bar 58 is moved toward the left as depicted in FIG. 4 the leftmost track extender is caused to be displaced inwardly by means of the pivoting of mechanism 60 about pivot points 102 and 108. In FIG. 5 an identical mechanism 60 can be used to the one shown in FIGS. 3 and 4.

Referring now to FIG. 5, like reference characters will be used where appropriate. FIG. 5 shows a fragmentary plan view of the housing 12 button array 42, volume control 44 and, in cutaway, another embodiment for the mode selection mechanism of the present invention. This mechanism comprises a bar 58 of the same general shape as the bar shown in FIGS. 3 and 4, card drive wheel 24, capstan 22, common drive motor 50, track extender mechanisms 60 and track extenders 32 which may be of the same general configuration as those shown in FIGS. 3 and 4.

In the position shown in FIG. 5, which is the card drive position the arm 76 couples between bar 58 and pivot mechanism 110. The shoulder 88 on arm 76 is shown urged against capstan support 90 thereby urging the capstan 22 and its associated pulley 94 away from belt 92 so that there is no drive to the capstan. A spring 68 fastens at one end to pin 70 and at the other end to locating pin 64 and maintains the arm 76 in this card drive position. Detent plate 66 is provided with locating detents for receiving pin 64 in both positions of operation.

The embodiment of FIG. 5 may have a mode selector switch such as the switch 36 associated therewith for moving the bar 68 toward the left as depicted in FIG. 5. When that occurs the shoulder 88 disengages from capstan support 90 and the capstan is driven by means of belt 92.

Figure 6:
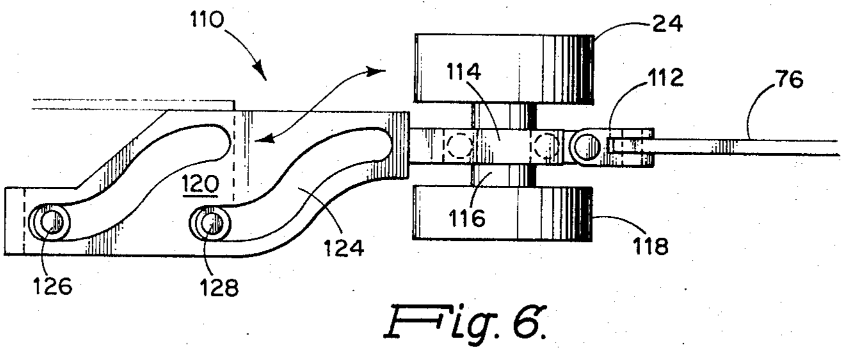
FIG. 6 is a side view of a part of the mechanism shown in FIG. 5 and in particular the means for displacing the card drive wheel between the card engaging and disengaging positions.

With reference to the operation of card drive mechanism 110 reference is also made to FIG. 6 which is a plan view of the mechanism 110. The arm 76 couples to a coupling member 112 which may be similar to the member 86 shown in FIGS. 3 and 4. This member couples to a support platform 114 having a shaft 116 extending therethrough for receiving at one end a drive wheel 118 and at the other end card drive wheel 24. In the position shown in FIG. 5 the arm 76 is at its rightmost position and the wheel 118 engages the drive wheel associated with motor 50 which in turn drives the card drive wheel 24 which is urged against card 30. When the arm 76 has been moved to the position shown in FIG. 6 the drive wheel 118 disengages and no drive is provided to drive wheel 24.

The platform 114 also connects as shown in FIGS. 5 and 6 to parallel walls 120 which are suitably secured and spaced as shown in FIG. 5. Each of the walls 120 has a pair of tracks 122 and 124 defined therein having followers 126 and 128 riding therein. These followers 126 and 128 are coupled together by means of arm 130 which connects to platform 114. FIG. 6 shows the followers at their lowermost position and thus the card drive wheel 24 is also at its lowermost and leftmost position as viewed in FIG. 6. When the arm 76 is moved to the right as depicted in FIG. 6 the followers 126 to 128 travel in tracks 122 and 124, respectively, and the card drive wheel 24 is raised into contact with card 30. Similarly, the wheel 118 which couples to card drive wheel 24 is driven from motor 50. In the cassette mode of operation where the bar 58 is in its leftmost position as indicated in FIG. 5 the plate 66 is provided with a detent 72 similar to the one shown in FIG. 3 for maintaining the arm 50 in that position against the bias of spring 68. The mechanisms 60 shown in FIG. 5 operate identical to the mechanisms shown in FIGS. 3 and 4 and thus are not again discussed in detail.

Figure 7:
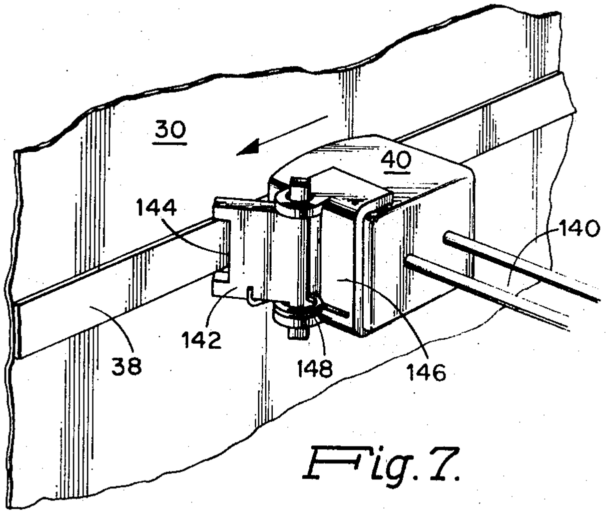
FIG. 7 is a perspective view showing the transducer means of the present invention in association with a card wherein the transducer means has pivotal tape guide means associated therewith.

FIG. 7 shows the transducer head 40 having appropriate conductors 140 coupled thereto, and a fragmentary portion of card 30 with magnetic strip 38 affixed thereto. When there is a cassette in the machine it is desirous to have the tape guide 142 having the tape accommodating channel 144 urged against the tape. The tape guide assembly 146 couples to transducer 40, may be secured in some suitable manner and includes a spring 148 for urging the guide 142 against the tape. However, when a card is to be used with the device it is advantageous that assembly 146 not interfere with the card movement. Therefore, when a card is inserted into the machine and the machine is put into the card mode of operation the card simply deflects the spring 148, moving the guide 142 essentially out of the path of movement of the card.

Figure 8:
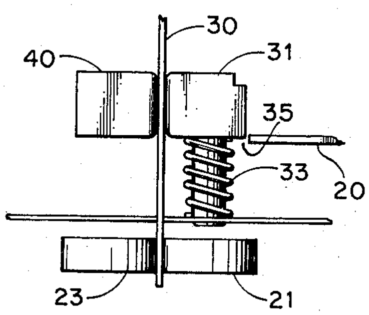
FIG. 8 is a cross sectional side view through another embodiment of the invention in the card mode of operation and taken in the vicinity of the transducer means wherein the card is driven at a bottom edge thereof.

FIG. 8 shows a cross sectional partial view depicting another embodiment of the present invention. This view is taken in the vicinity of the transducer 40 and shows the card 30 being urged by a pressure pad 31 against the card 30. FIG. 8 also shows the bottom floor 20 and a card drive wheel 21 and idler wheel 23 disposed therebelow. The card drive wheel 21 is preferably driven from a common drive means and it may be movable or not toward and away from the bottom edge of the card 30. The pressure pad 31 may be supported by a spring 33 so that when in the card mode of operation the pressure pad is allowed to extend above the floor 20 and urge the card against the transducer head. Alternatively, when in the tape mode of operation a cassette can be inserted and the pressure pad 31 is automatically depressed through aperture 35 below the floor 20 so that it does not interfere with the cassette operation.

In a preferred embodiment it is preferred that the cassette operate in a more or less conventional fashion traversing the tape from left to right at a speed of approximately 1.75 inches per second. The cards on the other hand travel from right to left preferably at a speed on the order of 2.25 inches per second. Recording and playback of both the tapes and cards are by way of the same set of control buttons 42.

Also, with respect to the track selector switch reference has been made to the prior application Ser. No. 273,441 which also discloses an override means which may be used to permit recording on the instructor track.

It is also preferred that the transducer head 40 contain an integral erase winding which will be used for erasing cards. A separate conventional erase head is preferably contained in the device to erase tapes. The transducer 40 has the erase winding disposed on one side and the separate erase head on the other because of the different directions of travel of the cards and tape.

What is claimed is:

1. An audio recording and reproducing machine capable of handling either a tape cassette or card having a magnetic media associated therewith comprising:

a housing having means defining a well for receiving the tape cassette;

means for driving the tape in the cassette;

said housing defining a guide channel having a track for said card to pass along;

means for driving said card through the guide channel, said housing defining an opening for receiving said card driving means;

manually operable means for selecting either the card or tape mode of operation;

and mode selection means responsive to said manually operable means being in the tape mode of operation for maintaining said card drive means in said opening and enabling said tape drive means, and responsive to said manually operable means being in the card mode of operation for moving said card drive means out of said opening adjacent to said channel and disabling said tape drive means.

2. The machine of claim 1 wherein said opening for said card drive means is defined in a bottom floor of said cassette receiving well.

3. The machine of claim 2 wherein said tape drive means includes a drive capstan extending above said bottom floor.

4. The machine of claim 3 wherein said card drive means includes a card drive wheel disposed opposite the transducer means when in the card mode of operation.

5. The machine of claim 1 comprising means for extending the length of said track when in the card mode of operation.

6. The machine of claim 5 wherein said track extending means includes a pair of track extenders disposed on opposite sides of said machine, said mode selection means including means for extending said extenders during the card mode of operation and retracting said extenders during the tape mode of operation.

7. The machine of claim 6 wherein said track extenders are pivotally supported at the sides of said machine, said machine defining recesses for accommodating said extenders when in the tape mode of operation.

8. The machine of claim 5 wherein said mode selection means comprises an elongated bar movable by said manually operable means, the ends of said bar having the means for extending the length of the track coupled thereto.

9. The machine of claim 8 comprising an arm secured to said bar for moving said card drive means toward and away from said channel and disabling and enabling said tape drive means, respectively.

10. The machine of claim 1 comprising a common drive means which is selectively used to drive either the card drive means or the tape drive means, said card drive means being movable into engagement with said common drive means in the carddrive mode of operation and out of engagement with said common drive means in the tape drive mode of operation.

11. The machine of claim 10 wherein said tape drive means includes a capstan and belt selectively driven from said common drive means, said capstan being movable out of drive with said belt when in the card mode of operation and movable into drive with said belt when in the tape mode of operation.

12. The machine of claim 1 including a transducer means and tape guide means mounted to the transducer means and usable with a tape cassette and movable when in the card mode so as to not interfere with card travel.

13. An audio recording and reproducing machine for handling either a tape cassette or card having a magnetic media associated therewith comprising; a housing having a well for receiving the tape cassette, means for driving the tape in the cassette, said housing defining a guide channel having a track for said card to pass along, means for driving said card through the guide channel, means for selecting either a card or tape mode of operation and coupled to both said card drive means and said tape drive means, and common power means responsive to the position of said means for selecting for being selectively engageable with either said card drive means or said tape drive means.

14. An audio recording and reproducing machine as set forth in claim 13 wherein said card drive means includes a card drive wheel positioned to drive a bottom portion of said card, said wheel being positioned so as not to interfere with receipt of a tape cassette in the machine.

15. The machine of claim 14 including a spring-loaded pressure pad engageable with the card in the card mode of operation opposite the transducer means.

* * * * *